July 2, 1940.   W. F. BOLDT   2,206,658
FLUID PRESSURE METERING VALVE MECHANISM
Filed June 14, 1939
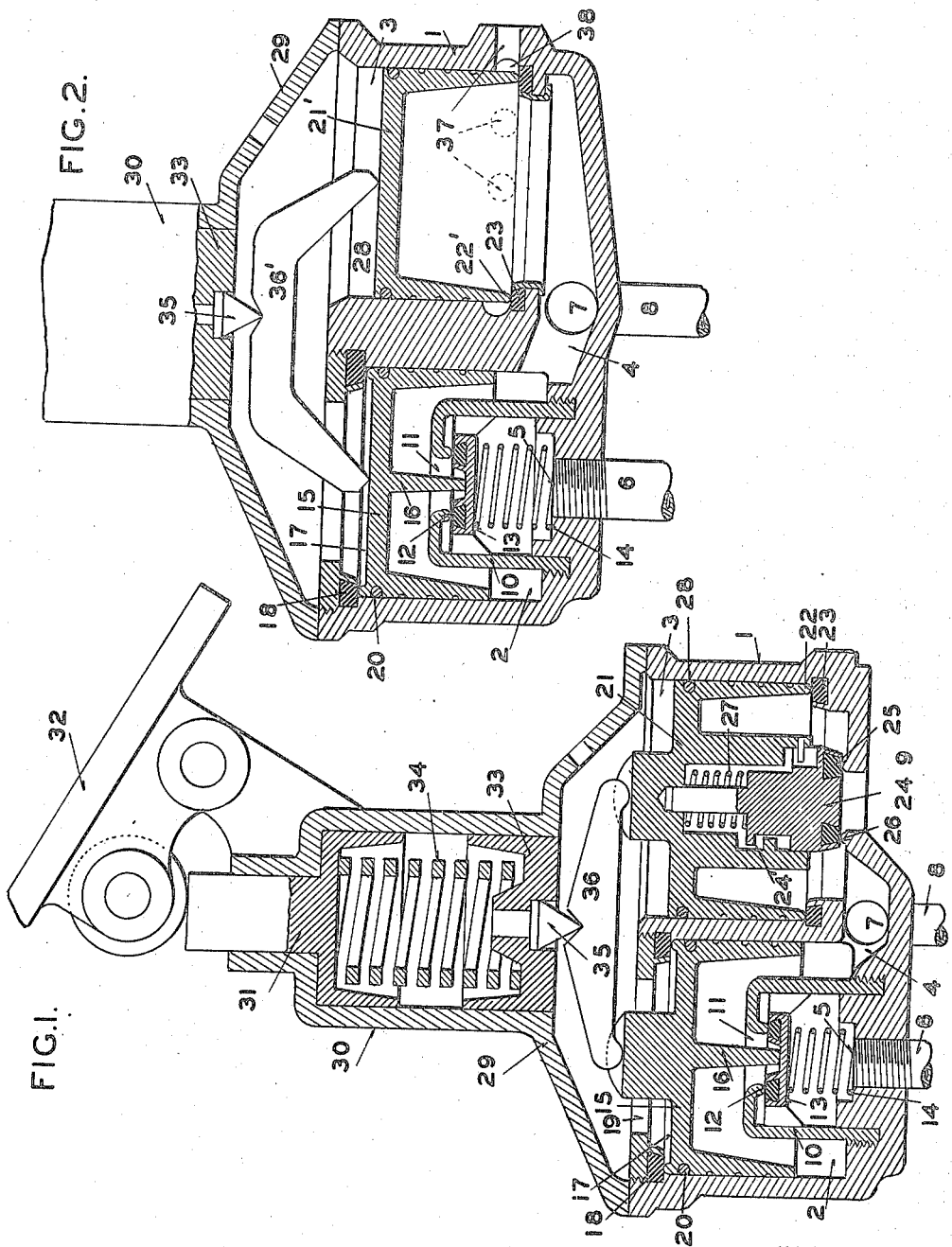
INVENTOR
WERNER F. BOLDT
BY
*E. E. Huffman*
ATTORNEY Patented July 2, 1940

2,206,658

UNITED STATES PATENT OFFICE 2,206,658

FLUID PRESSURE METERING VALVE MECHANISM

Werner F. Boldt, Clayton, Mo., assignor to Wagner Electric Corporation, St. Louis, Mo., a corporation of Delaware Application June 14, 1939, Serial No. 279,098

9 Claims. (Cl. 303—54)

My invention relates to valve mechanism for controlling fluid under pressure in a fluid pressure-actuated system and more particularly to a valve mechanism which permits the fluid under pressure to be metered into and out of the system.

One of the objects of my invention is to provide an improved valve mechanism of the class described which does not require a packing element associated with the slidable reaction piston to seal it with the cylinder wall, thus producing a valve mechanism having better operating characteristics and one by means of which the operator can accurately control the admission and exhaust of fluid under pressure to and from the actuating system.

Another object of my invention is to produce a metering valve mechanism embodying two slidable pistons for obtaining the reaction effect on the operator-operated actuating member, one of said pistons controlling the admission of fluid pressure and the other the exhaust of fluid.

Other objects of my invention will become apparent from the following description taken in connection with the accompanying drawing in which Figure 1 is a cross-sectional view of a valve mechanism embodying my invention; and Figure 2 is a cross-sectional view of a modified valve construction.

Referring to Figure 1, numeral 1 indicates a valve casing provided with two parallel cylinders 2 and 3 in constant communication with each other by means of a passage 4. The casing at the lower end of cylinder 2 is provided with a port 5 for placing it in communication with a suitable source of pressure by means of a conduit 6. The casing also has an outlet port 7 for connecting it with a conduit 8 leading to an actuated device, such as a power cylinder. The bottom of the casing is provided with an exhaust port 9 in axial alignment with cylinder 3.

Associated with the inlet port and mounted on the bottom wall of the casing is an inverted cup-shaped member 10 provided with an inlet opening 11 which has associated therewith a valve seat 12. Slidable in the cup-shaped member is a valve element 13 cooperating with valve seat 12 and normally biased to closed position by a spring 14.

The cylinder 2 has reciprocably mounted therein a piston 15 provided with a downwardly extending projection 16 for engagement with valve element 13 whereby it may be moved to open position. The piston is of such size as to have a loose fit in the cylinder, thus reducing the friction between the wall of the cylinder and the piston to a minimum. The upper or outer end of the piston is provided with an annular rib 17 which is adapted to cooperate with an annular rubber seat 18 carried by a ring 19 screwed into the top of the cylinder. The piston is also shown as carrying a friction ring 20 for providing a slight constant friction.

The cylinder 3 has loosely mounted therein a piston 21, the skirt end 22 of which cooperates with an annular rubber seat 23 mounted in the bottom of the case. The piston carries a valve element 24 which is provided with an annular rubber element 25 for cooperation with an annular seat 26 surrounding the exhaust port 9. The valve member 24 has a lost motion connection 24' with the piston and is normally biased in a direction away from the piston by a spring 27. The piston is also provided with a friction ring 28.

The top of the casing 1 has associated therewith a housing 29 provided with an upstanding cylindrical portion 30 within which is mounted a plunger 31 adapted to be actuated by a lever 32 pivotally mounted on the cylindrical portion. Also, within the cylindrical portion is a piston-like member 33 and interposed between this member and the plunger is a coil spring 34 normally in uncompressed condition. The member 33 carries an abutment element 35 for engagement with the intermediate portion of a balancing lever 36, the ends of which engage the tops of the pistons 15 and 21.

The normally inoperative positions of the parts of the valve mechanism are as shown in Figure 1. The spring 34 is uncompressed and the inlet valve element 13 is seated, thus preventing air under pressure from entering the cylinder. When it is desired to admit fluid under pressure through conduit 8 to the device to be actuated (not shown), the pedal 32 is operated, thereby causing spring 34 to be compressed and force applied to the intermediate portion of the balancing lever 36. The lever 36 will fulcrum on the piston 21 since this piston cannot move downwardly due to the engagement of the skirt end 22 with seat 23. The piston 15, however, is free to move downwardly by lever 36 and this movement will cause the inlet valve member 13 to be opened. Fluid under pressure will now be admitted into cylinder 2, cylinder 3 and out through conduit 8 leading to the device to be actuated. When sufficient pressure has been admitted into cylinder 2 to move the piston 15 upwardly and compress spring 34, the inlet valve 13 will be reseated and the rib 17 on the piston will engage seat 18 and prevent any escape of fluid around the loosely fitted piston. If additional fluid pressure is desired, pedal 32 may be moved an additional distance, thereby moving piston 15 downwardly to again open the inlet valve. When this additional pressure is admitted into cylinder 2, piston 15 will again be moved upwardly to its position shown in the figure wherein the inlet valve element 13 will be again closed. During the downward movement of the piston there may be a slight leakage of fluid past the piston but this leakage will be very small since the lapse of time during which the rib 17 is disengaged from seat 18 is short.

When it is desired to release the fluid under pressure in the device connected to conduit 8, pedal 32 is released. This will permit spring 34 to expand and the fluid pressure effective on piston 21 will cause this piston to move upwardly. After a short movement, the piston will pick up the valve member 24 and move it off the exhaust port seat 26 to thus permit air to escape to the atmosphere. If the pedal is fully released, all the air will be exhausted but if it is only partially released, then when a predetermined amount of fluid under pressure is exhausted, spring 34 will force piston 21 downwardly and cause the valve member 24 to be reseated. The pressure of the fluid in the system will be proportional to the force being exerted by spring 34.

The area of piston 21 which is subjected to the fluid pressure is slightly less than the area of the piston 15 which is subjected to the same fluid pressure. Thus the force tending to move piston 21 upwardly will be less than the force tending to hold piston 15 in its upper position. Because of this, there is no possibility of piston 21 being moved upwardly and valve element 24 unseated when piston 15 is moved downwardly to cause fluid under pressure to enter the cylinders from the source of pressure.

By the arrangement described, the loosely mounted pistons permit substantially all friction to be eliminated in the operation of the valve mechanism. Leakage past the pistons is prevented at all times except during the short interval of time when the pedal is moved. This leakage is slight and, therefore, does not affect efficient operation of the valve mechanism. The amount of fluid which may be admitted and exhausted is very accurately determined in accordance with the movement of pedal 32. There are no packing cups carried by the pistons which tend to frictionally grip the cylinder walls under the action of fluid pressure, thus, the pistons are freely movable and their movements properly control the inlet and exhaust valves.

Referring to the modification shown in Figure 2, the structure is quite similar to the valve mechanism just described and similar parts are designated by similar reference characters. The piston 15 for controlling the inlet valve 13 is the same as previously described. The piston arrangement for controlling the exhaust of fluid from the casing 1 has been slightly altered. The cylinder 3 has reciprocable therein a piston 21', the skirt end 22' of which cooperates with the annular rubber seat 23. The exhaust valve element 24 is eliminated and the skirt of piston 21' is employed to control the exhaust. A plurality of exhaust ports 37 communicate with an annular groove 38 in the wall of cylinder 3 just above the annular rubber seat 23. Thus, when the piston 21' moves upwardly to disengage the end 22' of the skirt from the seat 23, the groove 38 and exhaust ports 37 will be placed in communication with the conduit 8, thus permitting fluid to be exhausted from this conduit and the actuated device connected thereto. The balancing lever 36' which is actuated by the abutment 35 to control the pistons 15 and 21' is substantially the same as the one shown in Figure 1, but the abutment 35 instead of engaging the center of the lever engages the lever at a point offset from the center toward the end which engages the piston 21'. Thus, when spring 34 is compressed to apply a force to lever 36', a slightly greater force will be transmitted to piston 21' than to piston 15. This insures that piston 21 will not move upwardly under the action of the fluid pressure effective thereon when fluid is admitted through inlet valve 13.

When spring 34 is compressed, piston 15 will be operated to admit fluid under pressure and this fluid under pressure will then cause piston 15 to be moved upwardly until the valve becomes closed and the rib 17 of the piston is again engaged with seat 18. When spring 34 is allowed to expand by release of the foot pedal, the force effective on piston 21' will be decreased, thus permitting this piston to move upwardly under the action of the fluid pressure and place the exhaust ports 37 in communication with conduit 8 to exhaust the fluid under pressure.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In valve mechanism, a fluid pressure receiving chamber having associated therewith an inlet valve means and an exhaust valve means, a movable element for controlling the inlet valve means and being so associated with the chamber that a differential fluid pressure can act thereon and tend to move it to valve-closed position, a second movable element having associated therewith of part of the exhaust valve means and also being so associated with the chamber that a differential fluid pressure can act thereon and tend to move the exhaust valve means to valve-open position, a lever operatively connected at its ends to said elements, and means for applying force to the intermediate portion of the lever, the force transmitted to said elements by said lever being in a direction to cause the first named element to move to valve open position and the second named element to move to valve closed position and the point of application of force to the intermediate portion of the lever being such that a greater force will be transmitted to the second element than to the first element.

2. In valve mechanism, a chamber having associated therewith an inlet valve means and an exhaust valve means, a piston for controlling the inlet valve means and being so associated with the chamber that the fluid pressure in the chamber acts thereon and tends to move it to valve-closed position, a second piston for controlling the exhaust valve means and being so associated with the chamber that the fluid pressure in the chamber acts thereon and tends to move it to valve-open position, a lever operatively connected at its ends to said pistons, and means comprising a spring for applying force to the intermediate portion of the lever, the force transmitted to said pistons by said lever being in a direction to cause the first piston to move to valve-open position and the second piston to valve-closed position and the point of application of force to the intermediate portion of the lever being such that a greater force will be transmitted to the second piston than to the first piston.

3. In valve mechanism, a casing provided with a pair of intercommunicating cylinders, inlet valve means, exhaust valve means, a piston for controlling the inlet valve means and being loosely mounted in one cylinder and so acted upon by fluid pressure in the casing that it is moved toward valve-closed position, a piston for controlling the exhaust valve means and being loosely mounted in the other cylinder and so acted upon by fluid pressure in the casing that it is moved toward valve-open position, means forming a seal between the first piston and the cylinder when the piston is in valve-closed position, means forming a seal between the second piston and the cylinder when the piston is in valve-closed position, and means comprising a yieldable element for applying force to each piston in a direction tending to cause the first piston to move to valve-open position and the second piston to valve-closed position.

4. In valve mechanism, a casing provided with a pair of intercommunicating cylinders, inlet valve means, exhaust valve means, a piston for controlling the inlet valve means and being loosely mounted in one cylinder and so acted upon by fluid pressure in the casing that it is moved toward valve-closed position, a piston for controlling the exhaust valve means and being loosely mounted in the other cylinder and so acted upon by fluid pressure in the casing that it is moved toward valve-open position, means forming a seal between the first piston and the cylinder when the piston is in valve-closed position, means forming a seal between the second piston and the cylinder when the piston is in valve-closed position, a lever operatively connected at its ends to the pistons, and means comprising a yieldable element for applying force to the intermediate portion of the lever, the force transmitted to each piston being in a direction tending to cause the first piston to move to valve-open position and the second piston to valve-closed position.

5. In valve mechanism, a casing provided with a pair of intercommunicating cylinders, inlet valve means, exhaust valve means, a piston for controlling the inlet valve means and being loosely mounted in one cylinder and so acted upon by fluid pressure in the casing that it is moved toward valve-closed position, a piston for controlling the exhaust valve means and being loosely mounted in the other cylinder and so acted upon by fluid pressure in the casing that it is moved toward valve-open position, means forming a stop for the first piston when the piston is in valve-closed position, cooperating means on the piston and stop providing a seal between the piston and its cylinder, means forming a stop for the second piston when in valve-closed position, cooperating means on the piston and the stop providing a seal between the piston and its cylinder, and means comprising a spring for applying force to each piston in a direction tending to cause the first piston to move to valve-open position and the second piston to valve-closed position.

6. In valve mechanism, a casing provided with a pair of intercommunicating cylinders, inlet valve means, exhaust valve means, a piston for controlling the inlet valve means and being so acted upon by fluid pressure in the casing that it is moved toward valve-closed position, a piston for controlling the exhaust valve means and being so acted upon by fluid pressure in the casing that it is moved toward valve-open position, means forming a stop for the first piston when the piston is in valve-closed position, cooperating means on the piston and the stop providing a seal between the piston and its cylinder, means forming a stop for the second piston when in valve-closed position, cooperating means on the piston and the stop providing a seal between the piston and its cylinder, an operator-operated member, and means between the last named member and the piston for applying a greater force to the second piston than to the first piston, said means comprising a spring and lever means, the force transmitted to the pistons being in a direction tending to cause the first piston to move to valve-open position and the second piston to valve-closed position.

7. In valve mechanism, a chamber having associated therewith inlet valve means comprising a movable element and an exhaust valve means comprising a movable element, a piston for controlling the movable element of the inlet valve means and being so associated with the chamber that fluid pressure therein acts on the piston and tends to move it to valve-closed position, a second piston so associated with the chamber that the fluid pressure therein acts on the piston, means for connecting the movable valve element of the exhaust valve means to the second piston by a lost motion connection, said connection being such that the exhaust valve will be carried by the piston to an open position after a predetermined movement of the piston under the action of fluid pressure, and means comprising a spring for simultaneously applying force to each piston in a direction tending to cause the first piston to move to valve-open position and the second piston to a position permitting the movable element of the exhaust valve means to be closed.

8. In valve mechanism, a chamber having associated therewith an inlet port, a valve for controlling the inlet port, a piston for controlling the inlet valve and being so associated with the chamber that fluid pressure therein acts on the piston and tends to move it to valve-closed position, means forming a stop for the piston when the piston is in valve-closed position, cooperating means on the piston and the stop providing a seal between the piston and the cylinder, a second piston so associated with the chamber that the fluid pressure therein acts on the piston, means forming a stop for the second piston, cooperating means on the piston and the stop forming an exhaust valve for controlling the exhaust of fluid from the chamber, and means comprising a spring for applying force to each piston in a direction tending to cause the first piston to move to valve-open position and the second piston to be held against its stop.

9. In valve mechanism, a fluid pressure receiving chamber having associated therewith an inlet valve means and an exhaust valve means, two cylinders, a piston loosely mounted in one cylinder for controlling the inlet valve means and being so associated with the chamber that a differential fluid pressure acts thereon and tends to move it to valve-closed position, a second piston loosely mounted in the other cylinder for controlling the exhaust valve means and being so associated with the chamber that a differential fluid pressure acts thereon and tends to move it to valve-open position, means associated with each piston and its cylinder for sealing said piston only when it is in valve-closed position, and means comprising yieldable means for simultaneously applying force to each piston and in a direction to cause the first piston to move to valve-open position and the second piston to valve-closed position.

WERNER F. BOLDT.